United States Patent [19]

Schmitt

[11] Patent Number: 5,984,431
[45] Date of Patent: Nov. 16, 1999

[54] PUMPLESS ANTI-LOCK BRAKING SYSTEM USING SIX SOLENOID ACTUATED VALVES

[75] Inventor: Hubert Schmitt, Ochtendung, Germany

[73] Assignee: Kelsey Hayes Company, Livonia, Mich.

[21] Appl. No.: 08/999,366

[22] Filed: Dec. 29, 1997

Related U.S. Application Data

[60] Provisional application No. 60/034,589, Dec. 31, 1996.

[51] Int. Cl.⁶ ................................. B60T 8/34; B60T 8/36
[52] U.S. Cl. ..................................... 303/119.1; 303/113.1
[58] Field of Search ............................. 303/113.1, 113.2, 303/113.5, 114.1, 116.1, 116.2, 119.1

[56] References Cited

U.S. PATENT DOCUMENTS

| | | | |
|---|---|---|---|
| 3,514,160 | 5/1970 | Leiber . | |
| 4,418,966 | 12/1983 | Hattwig . | |
| 5,205,623 | 4/1993 | Holzwann et al. | 303/113.2 |
| 5,207,487 | 5/1993 | Holzmann et al. | 303/113.2 |
| 5,246,280 | 9/1993 | Sigl | 303/113.2 |
| 5,275,477 | 1/1994 | Schaefer et al. | 303/113.2 |
| 5,299,858 | 4/1994 | Beck | 303/113.2 |
| 5,445,445 | 8/1995 | Yukio | 303/113.5 |
| 5,697,682 | 12/1997 | Watanabe et al. | 303/169 |
| 5,779,328 | 7/1998 | Meigenthaler et al. | 303/122.12 |
| 5,826,950 | 10/1998 | Jonner et al. | 303/113.2 |
| 5,829,846 | 11/1998 | Zeiner et al. | 303/113.5 |

*Primary Examiner*—Chris Schwartz
*Attorney, Agent, or Firm*—MacMillan, Sobanski & Todd, LLC; A. Michael Tucker

[57] ABSTRACT

A vehicular anti-lock braking system includes a source of pressurized brake fluid connected to a pair of diagonally opposed wheel brakes. First and second normally open isolation valves are connected between the source of pressurized brake fluid and the wheel brakes so that fluid reaches one of the wheel brakes after passing through only one of the isolation valves and reaches the other of the wheel brakes after passing through both of the isolation valves. A normally closed dump valve is connected between the source of pressurized fluid and one of the isolation valves so that fluid is selectively routed from both of the wheel brakes and passed through the dump valve to relief fluid pressure at the wheel brakes.

20 Claims, 3 Drawing Sheets

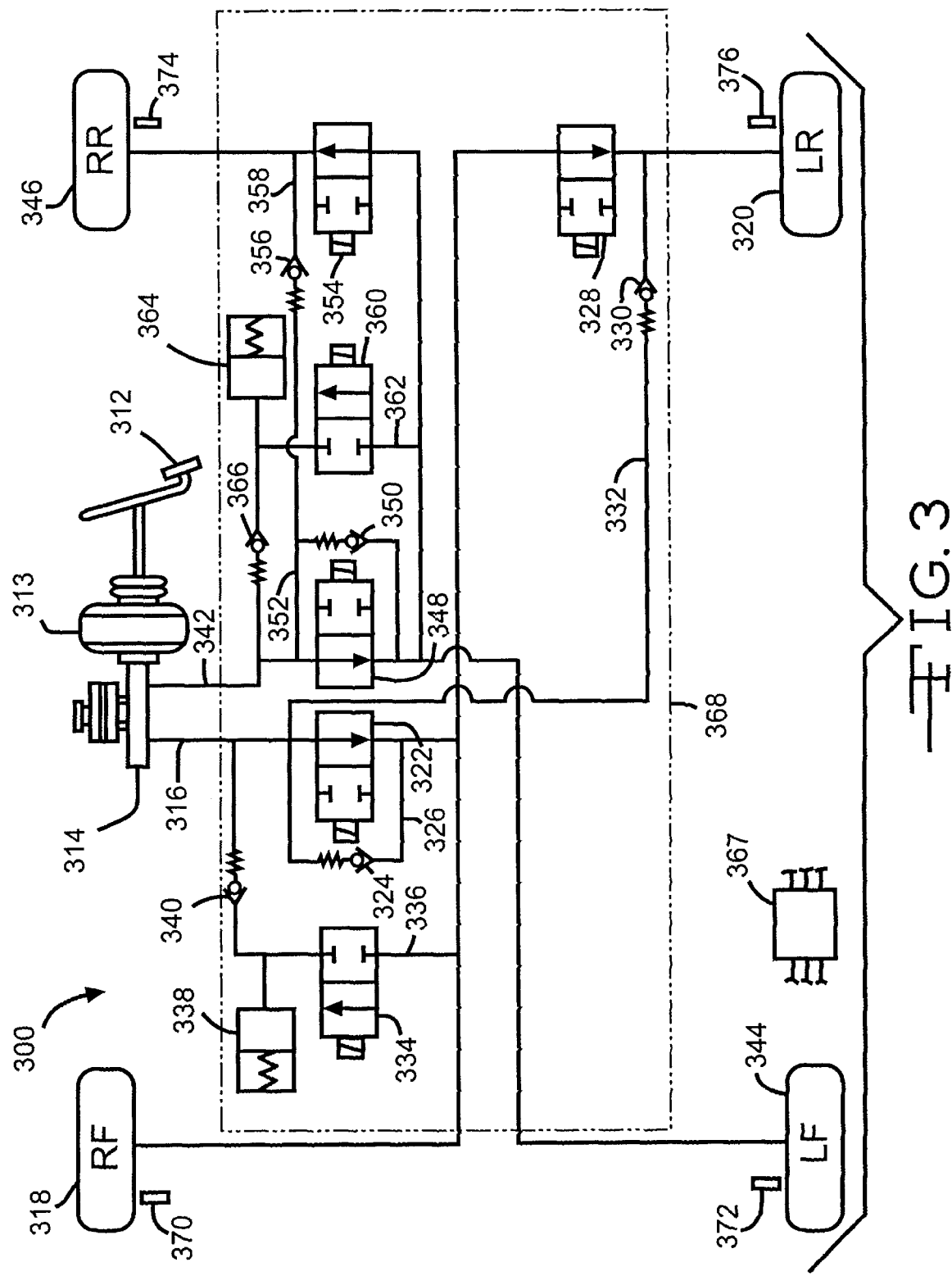

PUMPLESS ANTI-LOCK BRAKING SYSTEM USING SIX SOLENOID ACTUATED VALVES

CROSS-REFERENCE TO RELATED APPLICATION

This application claims the benefit of U.S. provisional patent application identified as Application No. 60/034,589, filed Dec. 31, 1996.

BACKGROUND OF THE INVENTION

This invention relates in general to hydraulic braking systems for vehicles and in particular to vehicular anti-lock braking systems not having a pump.

Anti-lock braking systems for vehicles are well known. A typical system utilizes a hydraulic control unit (HCU) incorporating several solenoid valves for control of brake fluid pressure to the wheel brakes and/or brake channels. For example, in a system utilizing an isolation valve and a dump valve for each wheel, a total of eight solenoid valves are housed in the HCU. Such a system also includes a pump housed in the HCU for dumping fluid through the dump valves and an electric motor for operating the pump.

It is desirable to reduce the cost of an anti-lock braking system by reducing the number of components required by the system, and in particular the number of components housed in the HCU. Furthermore, a reduction in the number of components housed in the HCU may result in a weight reduction of the HCU. Also, it is desirable to reduce noise emanating from the HCU during an anti-lock mode. A large source of noise is the pump and its electric motor. If the pump and motor are eliminated from an anti-lock braking system, a significant reduction in noise may be obtained.

SUMMARY OF THE INVENTION

This invention includes a vehicular anti-lock braking system utilizing six solenoid valves and two accumulators. Preferably, the valves and accumulators are arranged in a diagonally split system. Unlike conventional anti-lock braking systems, the present system does not use a pump or a motor. In addition to a reduction of costs, the weight and noise associated with a pump and its motor are eliminated from the system. Three embodiments of a pumpless anti-lock braking system are disclosed. In each of the systems, six solenoid valves and two accumulators are utilized to control fluid pressure at the wheel brakes.

In a preferred embodiment, a vehicular anti-lock braking system includes a source of pressurized brake fluid connected to a pair of diagonally opposed wheel brakes. First and second normally open isolation valves are connected between the source of pressurized brake fluid and the wheel brakes so that fluid reaches one of the wheel brakes after passing through only one of the isolation valves and reaches the other of the wheel brakes after passing through both of the isolation valves. A normally closed dump valve is connected between the source of pressurized fluid and one of the isolation valves so that fluid is selectively routed from both of the wheel brakes and passed through the dump valve to relieve fluid pressure at the wheel brakes.

Various objects and advantages of this invention will become apparent to those skilled in the art from the following detailed description of the preferred embodiments, when read in light of the accompanying drawings.

BRIEF DESCRIPTION OF THE DRAWINGS

FIG. 3 is a schematic representation of a third embodiment of a vehicular anti-lock braking system in accordance with this invention utilizing six solenoid valves and two accumulators.

DETAILED DESCRIPTION OF THE PREFERRED EMBODIMENTS

Figure 1:
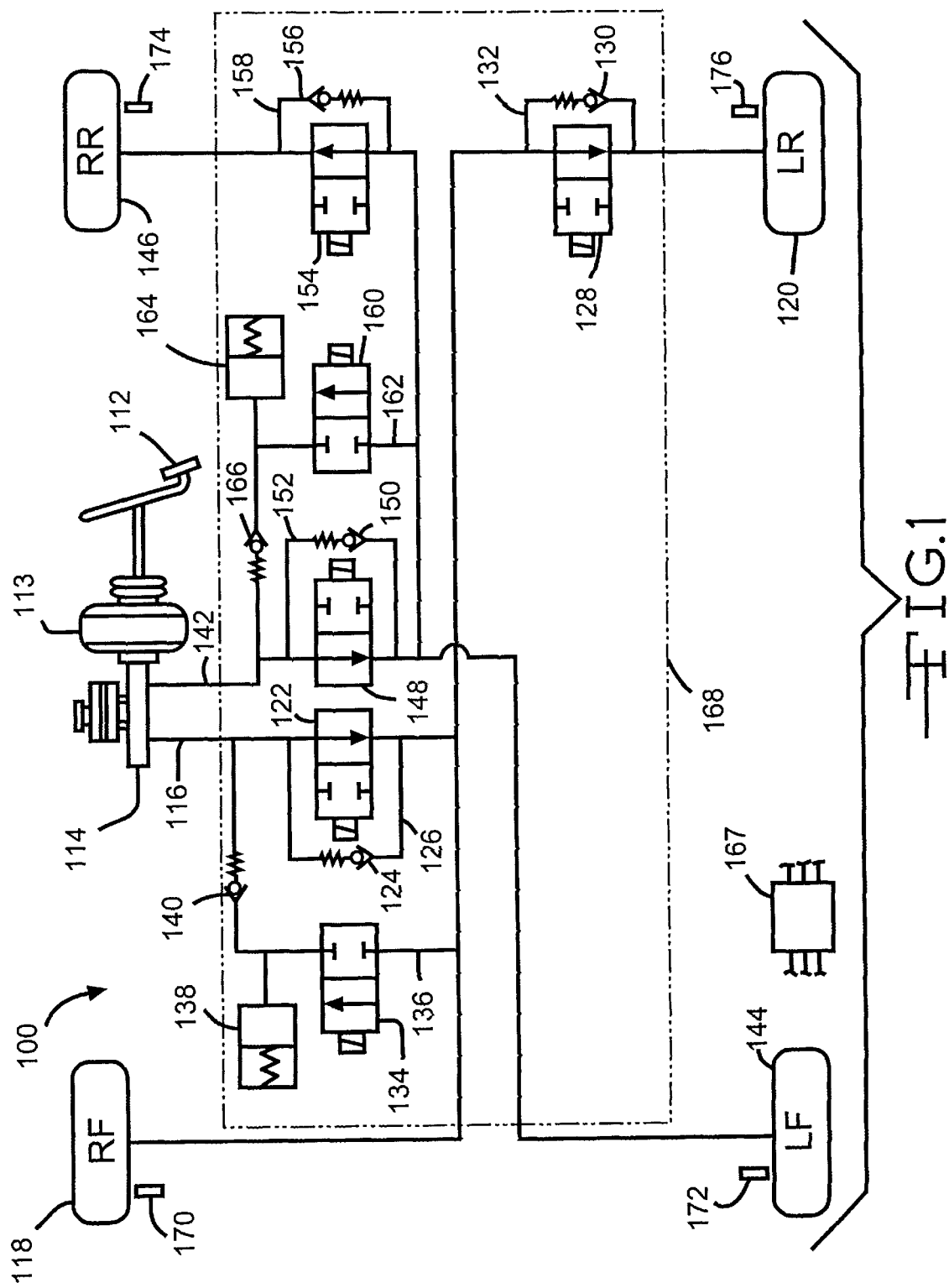
FIG. 1 is a schematic representation of a first embodiment of a vehicular anti-lock braking system in accordance with this invention utilizing six solenoid valves and two accumulators.

A vehicular anti-lock braking system according to this invention is schematically illustrated in FIG. 1 and indicated generally at 100. The braking system 100 includes a brake pedal 112 coupled to a master cylinder 114, preferably a two port master cylinder. Preferably, a vacuum booster 113 is positioned between the brake pedal 112 and the master cylinder 114 in a well known manner. When the vehicle operator depresses the brake pedal 112, the master cylinder 114 supplies hydraulic brake fluid under pressure through hydraulic lines or conduits to each wheel brake to slow and/or stop associated wheels.

The master cylinder 114 supplies brake fluid to a first supply line 116 which routes fluid to a right front wheel brake 118 and a left rear wheel brake 120. A two-position, normally open, solenoid actuated isolation valve 122 is arranged in the supply line 116 between the master cylinder 114 and the wheel brakes 118 and 120. A relief valve 124, preferably formed as a spring-loaded check valve, is provided in a bypass line 126 formed around isolation valve 122 and connected to the supply line 116 both downstream and upstream of isolation valve 122. Relief valve 124 permits one-way flow from a point in the supply line 116 downstream of the isolation valve 124 to a point in the supply line upstream of the isolation valve 124.

A two-position, normally open, solenoid actuated isolation valve 128 is provided in supply line 116 between isolation valve 122 and the left rear wheel brake 120. A return valve 130, preferably formed as a spring-loaded check valve, is provided in a bypass line 132 formed around isolation valve 128 and connected to the supply line 116 both downstream and upstream of isolation valve 128. Return valve 130 permits one-way flow from the left rear wheel brake 120 to the supply line 116.

A two-position, normally closed solenoid actuated dump valve 134 is provided in a first return line 136. The first return line 136 is formed around isolation valve 122 and connected to the supply line 116 both downstream and upstream of the isolation valve 122. An accumulator 138 is provided in return line 136 between dump valve 134 and the connection of the return line 136 to supply line 116 upstream of isolation valve 124. A spring-loaded check valve 140 is provided in the return line 136 between the accumulator 138 and the connection of the return line 136 to the supply line 116 upstream of the isolation valve 124. Check valve 140 permits one-way flow from the accumulator 138 to the supply line 116.

The master cylinder 114 also supplies brake fluid to a second supply line 142 which routes fluid to a left front wheel brake 144 and a right rear wheel brake 146. A two-position, normally open, solenoid actuated isolation valve 148 is provided in the supply line 142 between the master cylinder 114 and the wheel brakes 144 and 146. A relief valve 150, preferably formed as a spring-loaded check valve, is provided in a bypass line 152 formed around solenoid valve 148 and connected to the supply line 142 both downstream and upstream of isolation valve 148. Relief valve 150 permits one-way flow from a point in the supply line 142 downstream of the isolation valve 148 to a point in the supply line 142 upstream of the isolation valve 148.

A two-position, normally open, solenoid actuated isolation valve 154 is provided in supply line 142 between the isolation valve 148 and the right rear wheel brake 146. A return valve 156, preferably formed as a spring-loaded check valve, is provided in a bypass line 158 formed around solenoid valve 154 and connected to the supply line 142 both downstream and upstream of isolation valve 154. Return valve 156 permits one-way flow from the right rear wheel brake 146 to the supply line 142.

A two-position, normally closed, solenoid actuated dump valve 160 is arranged in a second return line 162. The second return line 162 is formed around isolation valve 148 and connected to the supply line 142 both downstream and upstream of the isolation valve 148. An accumulator 164 is provided in return line line 162 between dump valve 160 and the connection of the return line 162 to supply line 142 upstream of isolation valve 148. A spring-loaded check valve 166 is provided in the return line 162 between the accumulator 164 and the connection of the return line 162 to the supply line 142 upstream of the isolation valve 148. Check valve 166 permits one-way flow from the accumulator 164 to the supply line 142.

The solenoid actuated valves 122, 128, 134, 148, 154, and 160 are electrically connected to and controlled by an electronic controller 167 between open and closed (or closed and open) positions to modulate fluid pressure in the wheel brakes 118, 120, 144, and 146. The solenoid valves 122, 128, 134, 148, 154, and 160, the accumulators, 138 and 164, as well as check and return valves 124, 130, 140, 150, 156, and 166 are preferably housed in a single hydraulic control unit (HCU) indicated in phantom at 168. The HCU 168 can be formed from a block of a suitable material such as aluminum. The block includes bores for receiving the components and fluid passageways to connect the components as shown.

A wheel speed sensor 170, 172, 174, and 176 is provided at each wheel. Each sensor 170, 172, 174, and 176 is electrically connected to the electronic controller 167 and detects the speed of its associated wheel. These signals are used by the electronic controller 167 to actuate solenoid valves 122, 128, 134, 148, 154 and 160 to apply, dump and hold brake fluid pressure to the associated wheel brakes 118, 120, 144, and 146.

The rear axle return valves 130 and 156 are connected parallel to the rear wheel isolation valves 128 and 154, respectively. Check valves 130 and 156 permit fluid to be dumped from a respective wheel brake 128 and 146 when an associated isolation valve 128 and 154 is closed.

During an anti-lock mode of the system 100, an operator pushes on the brake pedal 112 and pressure is applied to the wheel brakes 118 and 120 through normally open isolation valves 122 and 128 and to wheel brakes 144 and 146 through normally open isolation valves 148 and 154. To dump brake pressure at the right front wheel brake 118, isolation valve 122 is closed while dump valve 134 is opened. The opened dump valve 134 permits the relatively high pressurized brake fluid at wheel brake 118 to reach an area of relatively low pressure formed between the closed dump valve 134 and the check valve 140. The accumulator 138 acts as a storage area to receive high pressure fluid from the wheel brakes. The accumulator 138, preferably a low pressure accumulator, controls the brake pressure at wheel brake 118. A control algorithm utilized by the electronic controller 167 prevents over-pressurization of the accumulator 138. At a predetermined pressure, check valve 140 will open to permit fluid to return to the supply line 116. To dump brake pressure at the left rear wheel brake 120, isolation valve 128 is closed when isolation valve 122 is closed and dump valve 134 is open. Fluid passes through the return valve 130 to reach the low pressure accumulator 138. Thus, the left rear brake wheel 120 can be dumped together with the right front wheel brake 118. Also, the right front wheel brake 118 can be dumped without affecting the left rear wheel brake 120.

In a similar manner, the operation of solenoid valves 148, 154, and 160 permit the left front wheel brake 144 and the right rear wheel brake 146 to be dumped together, or the left front wheel brake 144 can be dumped without affecting the right rear wheel brake 146.

Figure 2:
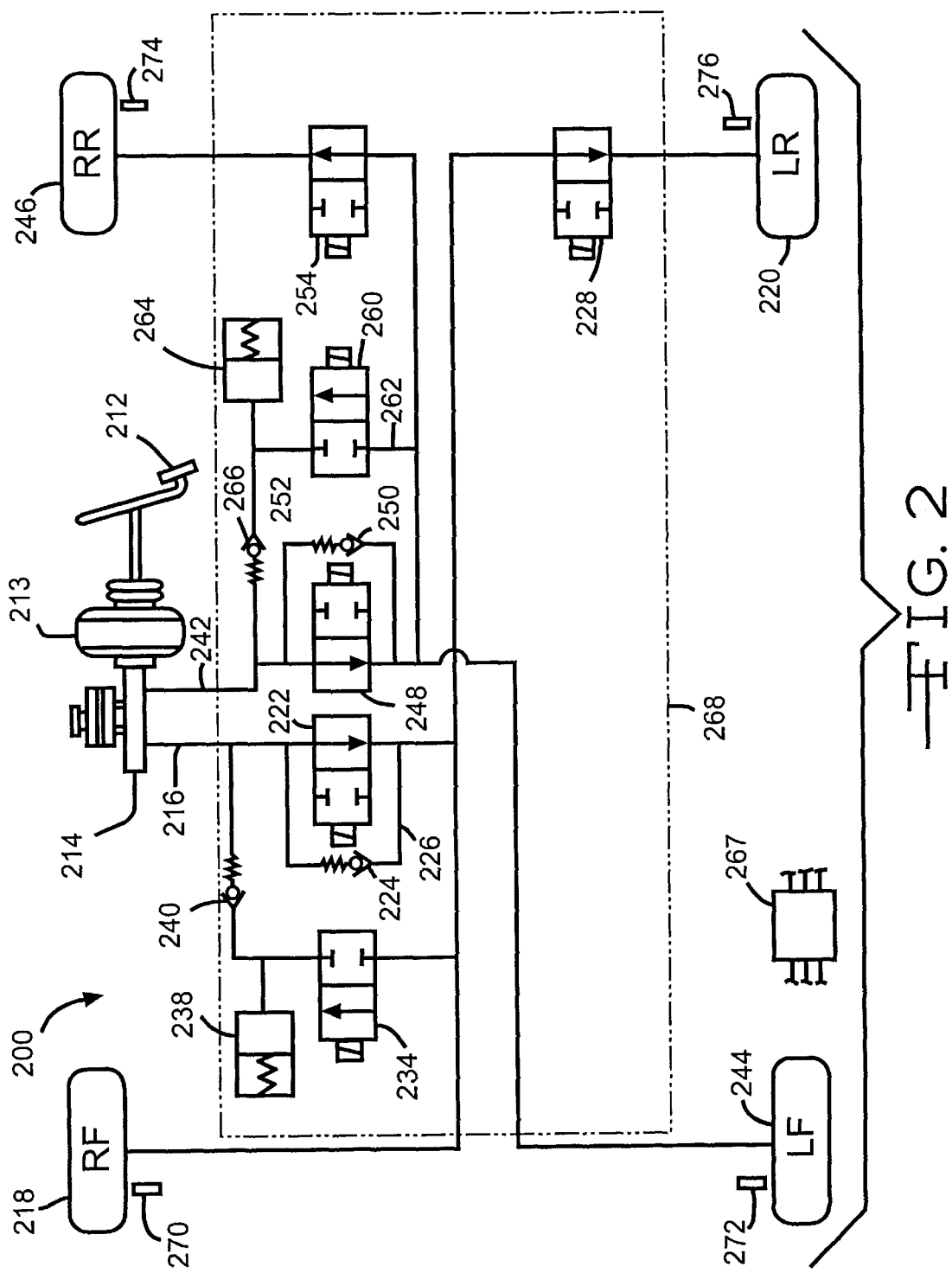
FIG. 2 is a schematic representation of a second embodiment of a vehicular anti-lock braking system in accordance with this invention utilizing six solenoid valves and two accumulators.

A second embodiment of a vehicular anti-lock braking system indicated generally at 200 is schematically illustrated in FIG. 2. System 200 is identical to system 100 except for the omission of equivalent valves for the rear axle check valves 130 and 156 and their associated bypass lines 132 and 158 found in system 100. The elements of system 200 utilize the reference numerals in the 200 series corresponding to like elements in system 100.

When an operator applies brake pedal 212, increased brake fluid pressure reaches wheel brakes 218 and 220 through normally open isolation valves 222 and 228, respectively. Brake fluid is dumped from the wheel brakes 218 and 220 by closing isolation valve 222 and opening dump valve 234. Brake fluid pressure is held at left rear wheel brake 220 by closing isolation valve 228.

Increased brake fluid pressure reaches wheel brakes 244 and 246 through normally open isolation valves 248 and 254. Brake fluid is dumped from the wheel brakes 244 and 246 by closing isolation valve 248 and opening dump valve 260. Brake fluid pressure is held at right rear wheel brake 246 by closing isolation valve 254.

A third embodiment of a vehicular anti-lock braking system indicated generally at 300 is schematically illustrated in FIG. 3. System 300 is identical to system 100 except for the routing of bypass lines 332 and 358 containing return valves 330 and 356, respectively. The elements of system 300 utilize the reference numerals in the 300 series corresponding to like elements in system 100.

A return valve 330, preferably formed as a spring-loaded check valve, is provided in a bypass line 332 connected at one end between the isolation valve 328 and the left rear wheel brake 320 and at the opposite end to the supply line 316 upstream of isolation valve 322. Return valve 330 permits one-way flow from the supply line 316 between the isolation valve 338 and the left rear wheel brake 320 to a point in the supply line 316 upstream of the isolation valve 322. In this manner, when fluid pressure in the bypass line 332 exceeds the cracking pressure of the return valve 330, fluid pressure is returned directly to the master cylinder 314 through supply line 316.

A return valve 356, preferably formed as a spring-loaded check valve, is provided in a bypass line 358 connected at one end between the isolation valve 354 and the right rear wheel brake 346 and at the opposite end to the supply line 316 upstream of isolation valve 348 (illustrated as a connection in the return line 352 downstream of the relief valve 350). Return valve 356 permits one-way flow from the supply line 342 between the isolation valve 354 and the right rear wheel brake 346 to a point in the supply line 342 upstream of the isolation valve 348. In this manner, when fluid pressure in the bypass line 358 exceeds the cracking pressure of the return valve 356, fluid pressure is returned directly to the master cylinder 314 through supply line 342.

The systems 100, 200, and 300 provide low cost anti-lock braking utilizing only six solenoid valves and two accumulators (preferably low pressure accumulators) in diagonally split systems. Pumps and electric motors, typical of conventional anti-lock braking systems, have been eliminated. Thus, pressurized fluid at the wheel brakes can be relieved without the use of a pump.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A pumpless, vehicular anti-lock braking system providing braking at each of a right front wheel brake, a left front wheel brake, a right rear wheel brake, and a left rear wheel brake, the system comprising:

a master cylinder;

a first supply line connected between the master cylinder and the right front and left rear wheel brakes and a second supply line connected between the master cylinder and the left front and right rear wheel brakes;

a first two-position, normally open solenoid actuated valve provided in the first supply line;

a second two-position, normally open solenoid actuated valve provided in the first supply line between the first normally open valve and the left rear wheel brake;

a first return line formed around the first normally open valve and connected to the first supply line both downstream and upstream of the first normally open valve;

a first two-position, normally closed solenoid valve provided in the first return line;

a first accumulator provided in the first return line between the first normally closed valve and the first supply line at its connection upstream of the first normally open valve;

a third two-position, normally open solenoid actuated valve provided in the second supply line;

a fourth two-position, normally open solenoid actuated valve provided in the second supply line between the third normally open valve and the right rear wheel brake;

a second return line formed around the third normally open valve and connected to the second supply line;

a second two-position, normally closed solenoid valve provided in the second return line; and a second accumulator provided in the second return line between the second normally closed valve and the second supply line;

wherein fluid pressure from the wheel brakes is dumped without use of a pump.

2. The braking system defined in claim 1 wherein a bypass line is formed around the second normally open valve.

3. The braking system defined in claim 2 wherein a return valve is provided in the bypass line.

4. The braking system defined in claim 3 wherein the return valve is a spring-loaded check valve permitting one-way fluid flow from a point in the first supply line downstream of the second normally open valve to a point in the first supply line upstream of the second normally open valve.

5. The braking system defined in claim 4 wherein the point in the first supply line upstream of the second normally open valve is also upstream of the first normally open valve.

6. The braking system defined in claim 1 wherein fluid pressure from the wheel brakes is dumped by opening the first and second normally closed valves.

7. The braking system defined in claim 6 wherein a bypass line is formed around the fourth normally open valve.

8. The braking system defined in claim 7 wherein a return valve is provided in the bypass line.

9. The braking system defined in claim 8 wherein the return valve is a spring-loaded check valve permitting one-way fluid from the a point in the second supply line downstream of the fourth normally open valve to a point in the second supply line upstream of the fourth normally open valve.

10. The braking system defined in claim 9 wherein the point in the second supply line upstream of the fourth normally open valve is also upstream of the third normally open valve.

11. The braking system defined in claim 1 wherein the solenoid valves and the accumulators are mounted in a hydraulic control unit connected between the master cylinder and the wheel brakes.

12. A pumpless, vehicular anti-lock braking system comprising:

a source of pressurized brake fluid connected to first and second diagonally opposed wheel brakes;

first and second normally open isolation valves connected between the source of pressurized brake fluid and the wheel brakes, wherein fluid reaches the first wheel brake after passing through only the first isolation valve and wherein fluid reaches the second wheel brake after passing through both of the first and second isolation valves; and a normally closed dump valve connected between the source of pressurized fluid and the first wheel brake, wherein fluid is selectively routed from both of the wheel brakes and passed through the dump valve to relieve fluid pressure at the wheel brakes without use of a pump.

13. The anti-lock braking system defined in claim 12 including an accumulator provided between the dump valve and the source of pressurized brake fluid.

14. The anti-lock braking system defined in claim 13 including a check valve provided between the accumulator and the source of pressurized brake fluid.

15. The anti-lock braking system defined in claim 12 including a return valve provided around the second isolation valve provided downstream of the first isolation valve.

16. The anti-lock braking system defined in claim 15 wherein the return valve directs fluid from the second wheel brake back to the source of pressurized fluid after traveling through the dump valve.

17. The anti-lock braking system defined in claim 12 wherein an accumulator is connected between the dump valve and the source of pressurized fluid.

18. The anti-lock braking system defined in claim 17 wherein a check valve is connected between the accumulator and the source of pressurized fluid to permit fluid flow only from the accumulator to the source of pressurized fluid.

19. The anti-lock braking system defined in claim 12 wherein the isolation and dump valves are mounted in a hydraulic control unit connected between the source of pressurized fluid and the wheel brakes.

20. A hydraulic control unit for a vehicular braking system, wherein the hydraulic control unit is connected between a master cylinder and each of a right front wheel brake, a left front wheel brake, a right rear wheel brake, and a left rear wheel brake, wherein a first supply line is connected between the master cylinder and the right front and left rear wheel brakes and a second supply line is connected between the master cylinder and the left front and right rear wheel brakes, the hydraulic control unit comprising a housing mounting:

- a first two-position, normally open solenoid actuated valve provided in the first supply line;
- a second two-position, normally open solenoid actuated valve provided in the first supply line between the first normally open valve and the left rear wheel brake;
- a first return line formed around the first normally open valve and connected to the first supply line both downstream and upstream of the first normally open valve;
- a first two-position, normally closed solenoid valve provided in the first return line;
- a first accumulator provided in the first return line between the first normally closed valve and the first supply line at its connection upstream of the first normally open valve;
- a third two-position, normally open solenoid actuated valve provided in the second supply line;
- a fourth two-position, normally open solenoid actuated valve provided in the second supply line between the third normally open valve and the right rear wheel brake;
- a second return line formed around the third normally open valve and connected to the second supply line;
- a second two-position, normally closed solenoid valve provided in the second return line; and
- a second accumulator provided in the second return line between the second normally closed valve and the second supply line;

wherein fluid pressure from the wheel brakes is dumped without use of a pump.

* * * * *